(12) United States Patent
Waks et al.

(10) Patent No.: US 7,848,603 B2
(45) Date of Patent: Dec. 7, 2010

(54) OPTICAL SWITCHING BASED ON DIPOLE INDUCED TRANSPARENCY

(75) Inventors: Edo Waks, Washington, DC (US); Jelena Vuckovic, Palo Alto, CA (US)

(73) Assignee: The Board Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 12/590,728

(22) Filed: Nov. 12, 2009

(65) Prior Publication Data

US 2010/0135612 A1      Jun. 3, 2010

Related U.S. Application Data

(63) Continuation of application No. 11/977,244, filed on Oct. 24, 2007, now Pat. No. 7,630,604.

(60) Provisional application No. 60/854,572, filed on Oct. 26, 2006.

(51) Int. Cl.
*G02B 6/26* (2006.01)
*G02B 6/42* (2006.01)
*G02F 1/035* (2006.01)

(52) U.S. Cl. .............................. 385/50; 365/2; 365/30; 372/97; 372/98; 398/178

(58) Field of Classification Search .................... 385/2, 385/16, 30, 39, 50, 122, 129–132; 372/21, 372/92, 97, 98; 398/178
See application file for complete search history.

(56) References Cited

U.S. PATENT DOCUMENTS

| | | | | |
|---|---|---|---|---|
| 7,406,221 | B2* | 7/2008 | Noda et al. | 385/30 |
| 2004/0175087 | A1* | 9/2004 | Soljacic et al. | 385/129 |
| 2007/0025673 | A1* | 2/2007 | Bose et al. | 385/129 |
| 2008/0089367 | A1* | 4/2008 | Srinivasan et al. | 372/19 |
| 2008/0224121 | A1* | 9/2008 | Bose et al. | 257/13 |

* cited by examiner

*Primary Examiner*—Daniel Petkovsek
(74) *Attorney, Agent, or Firm*—Lumen Patent Firm

(57) ABSTRACT

A normally opaque waveguide interacting with a drop-filter cavity can be switched to a transparent state when the drop filter is also coupled to a dipole. This dipole induced transparency may be obtained even when the vacuum Rabi frequency of the dipole is much less than the cavity decay rate. The condition for transparency is a large Purcell factor. Dipole induced transparency can be used in quantum repeaters for long distance quantum communication.

8 Claims, 11 Drawing Sheets

$$\hat{a}_{out} = \frac{-\eta\hat{c}_{in}}{-i\Delta\omega+\eta+\frac{\kappa}{2}+\frac{g^2}{-i(\Delta\omega-\delta)+\gamma}} + \left(\frac{-i\Delta\omega+\frac{\kappa}{2}+\frac{g^2}{-i(\Delta\omega-\delta)+\gamma}}{-i\Delta\omega+\eta+\frac{\kappa}{2}+\frac{g^2}{-i(\Delta\omega-\delta)+\gamma}}\right)\hat{a}_{in} - \sqrt{\kappa\eta}\,\hat{e}_{in}$$

$$\hat{c}_{out} = \frac{-\eta\hat{a}_{in}}{-i\Delta\omega+\eta+\frac{\kappa}{2}+\frac{g^2}{-i(\Delta\omega-\delta)+\gamma}} + \left(\frac{-i\Delta\omega+\frac{\kappa}{2}+\frac{g^2}{-i(\Delta\omega-\delta)+\gamma}}{-i\Delta\omega+\eta+\frac{\kappa}{2}+\frac{g^2}{-i(\Delta\omega-\delta)+\gamma}}\right)\hat{c}_{in} - \sqrt{\kappa\eta}\,\hat{e}_{in}$$

OPTICAL SWITCHING BASED ON DIPOLE INDUCED TRANSPARENCY

RELATED APPLICATIONS

This application is a continuation of U.S. application Ser. No. 11/977,244, filed on Oct. 24, 2007, now U.S. Pat. No. 7,630,604 entitled "Dipole induced transparency drop-filter cavity-waveguide system", and incorporated by reference in its entirety. Application Ser. No. 11/977,244 claims the benefit of U.S. provisional patent application No. 60/854,572 filed on Oct. 26, 2006, which is incorporated herein by reference in its entirety.

GOVERNMENT RIGHTS

Inventions disclosed herein were made with U.S. Government support under contract DAAD19-03-1-0199 awarded by the U.S. Army Research Office. The Government has certain rights in the inventions.

TECHNICAL FIELD

The disclosure is generally related to semiconductor cavity quantum electrodynamics, optical switching and quantum information processing.

BACKGROUND

Cavity quantum electrodynamics (CQED) offers promising approaches for implementing quantum information processing. Quantum networks combine the ease of storing and manipulating quantum information in atoms, ions, or quantum dots, with the advantages of transferring information between nodes via photons, using coherent interfaces. So far, demonstrations of basic building blocks of such networks have relied on atomic systems. Successful solid-state implementation of these building blocks would open new opportunities leading to practical quantum information processing systems.

Semiconductor CQED has enjoyed recent rapid progress largely due to the development of high quality factor optical micro-cavities with mode volumes less than a cubic wavelength of light. These cavities allow previously unattainable interaction strengths between a cavity mode and a dipole emitter such as a quantum dot. Examples of applications requiring strong interactions between a cavity and dipole include methods for imparting conditional phase shifts on single photons, atom number detection, and non-linear optics.

One property of a cavity-dipole interaction is that, under appropriate conditions, the dipole can switch the cavity from being highly transmissive to being highly reflective. This can result in entanglement between the dipole and reflected field.

It has long been believed that in order for a dipole to fully switch a cavity, the vacuum Rabi frequency of the dipole must exceed both the cavity and dipole decay rates. Although this strong coupling regime has been attained in atomic systems, it is difficult to achieve using semiconductor technology. Semiconductor implementations of cavity QED systems, such as photonic crystal cavities coupled to quantum dots, usually suffer from large out-of-plane losses, resulting in short cavity lifetimes. Things become even more difficult when one attempts to integrate cavities with waveguides. The cavity-waveguide coupling rate must be sufficiently large that not too much field is lost out-of-plane. At the same time, leakage into the waveguide introduces additional losses, making the strong coupling regime even more difficult to achieve.

Systems and methods are needed that remove the necessity of using the strong coupling regime, allowing complete switching in a more practical parameter regime for semiconductors.

One of the main limitations of quantum communication is that communication rates decay exponentially with distance due to large losses induced by optical channels. In classical communication, channel losses can be overcome by optical amplifiers placed along the path of a fiber. At each amplifier node, the signal is boosted to overcome the fiber losses. This solution is not possible in quantum communication because amplification injects quantum noise into the channel, which destroys the state of the qubit.

The exchange of quantum bits over long distances can be achieved by creating an entangled state between two communication points. Quantum teleportation can be used to exchange qubits between nodes. Entanglement can be generated over long distance by creating entanglement between a large number of intermediate nodes (or repeater stations), which are spaced by short distances along the communication path. Entanglement swapping can then be used to create entanglement between the two end nodes. This procedure can be made fault tolerant by using entanglement purification protocols.

Quantum repeaters can be implemented in a variety of systems. All optical proposals, as well as proposals based on atomic systems have been extensively studied. More recent proposals rely on optically controlled spins in semiconductor cavities interacting with coherent light.

Systems and methods are needed for implementing quantum repeaters by exploiting cavity—dipole interactions in semiconductor systems.

Symbols used to denote various quantities in CQED have varied in the literature, including in our own work. Table 1 provides definitions for symbols used herein:

TABLE 1

| Definitions of various symbols. | |
|---|---|
| Symbol | Definition |
| 2 g | Rabi frequency; dipole - electric field coupling strength |
| $\gamma$ | Dipole decay rate into modes other than the cavity mode and to non-radiative decay routes; approximately equal to the bare dipole decay rate |
| $\kappa = \omega_0/2Q$ | Cavity field decay rate |
| $\omega_0$ | Cavity resonant frequency |
| Q | Cavity quality factor |
| $\eta$ | Energy decay rate from a cavity into each waveguide in a coupled cavity - waveguide system |

BRIEF DESCRIPTION OF THE DRAWINGS

FIG. 8 shows the input-output relations for the waveguide system of FIG. 3 in the weak excitation limit.

DETAILED DESCRIPTION

Disclosed herein are systems and methods for switching a cavity between transmissive and reflective states in the weak coupling, bad cavity limit using the principle of dipole induced transparency (DIT). DIT also leads to entanglement between dipoles and fields which is a condition that can be exploited for quantum repeaters.

Figure 1:
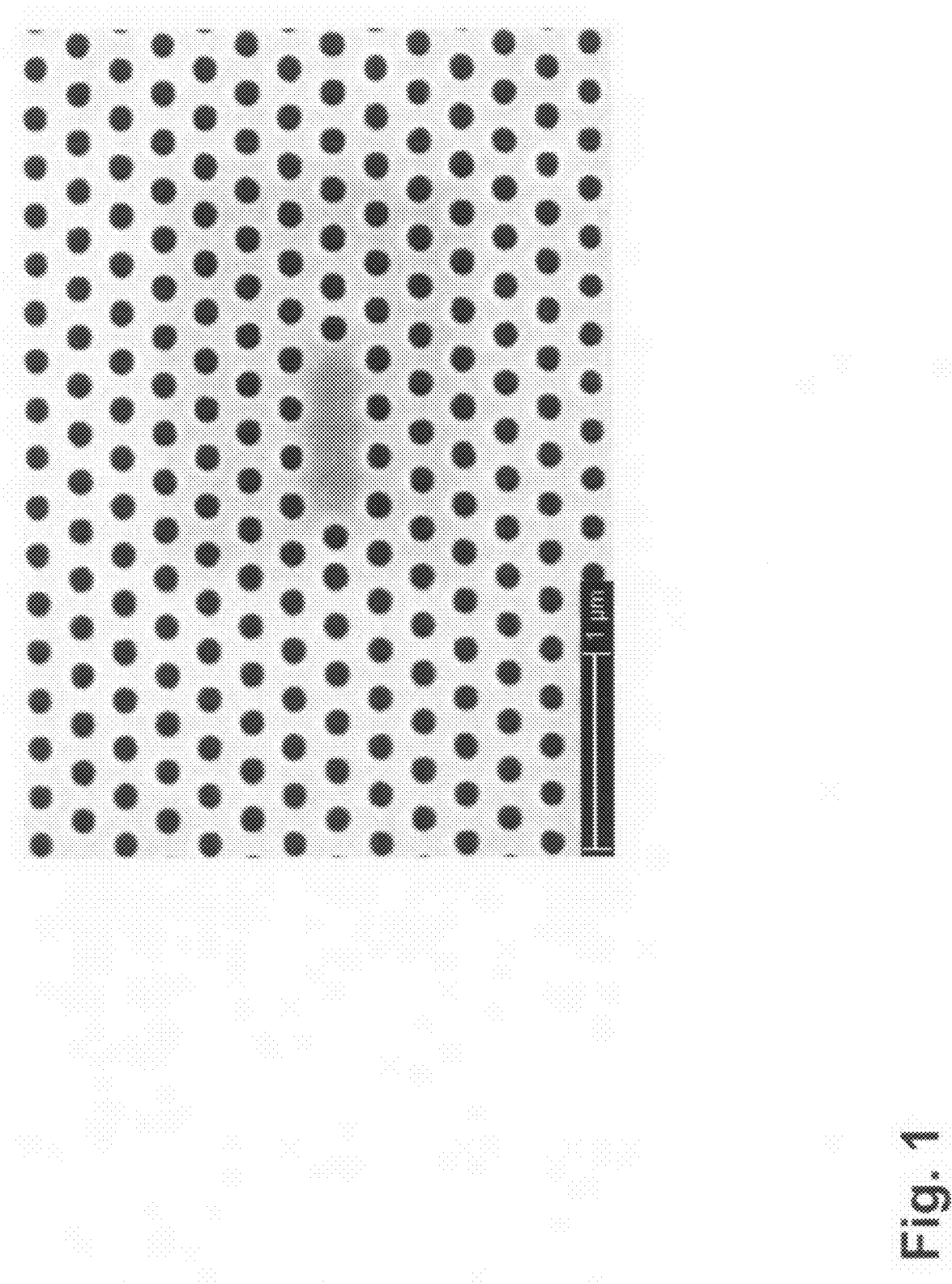
FIG. 1 is a scanning electron micrograph of a photonic crystal cavity fabricated in a GaAs slab containing InAs quantum dots.

Some of the systems disclosed herein have been implemented, and experiments to validate basic principles have been performed, in planar photonic crystal (PC) devices in GaAs incorporating InAs quantum dots (QDs). A scanning electron micrograph of an optical cavity formed in a photonic crystal is shown in FIG. 1. The scale bar in the lower left corner of the figure is one micron long.

QD wafers are grown by molecular beam epitaxy. They generally contain an active region comprising a 150-160 nm thick GaAs layer with a centered InAs/GaAs QD layer. The active layer is grown on an AlGaAs sacrificial layer (with high Al content), which is in turn grown on a GaAs substrate. Suspended PC structures are fabricated on such a wafer by a combination of electron beam lithography and dry etching (which creates a PC pattern in the top GaAs layer containing QDs), and a final wet etching step which dissolves a sacrificial layer underneath PC components.

Figure 2:
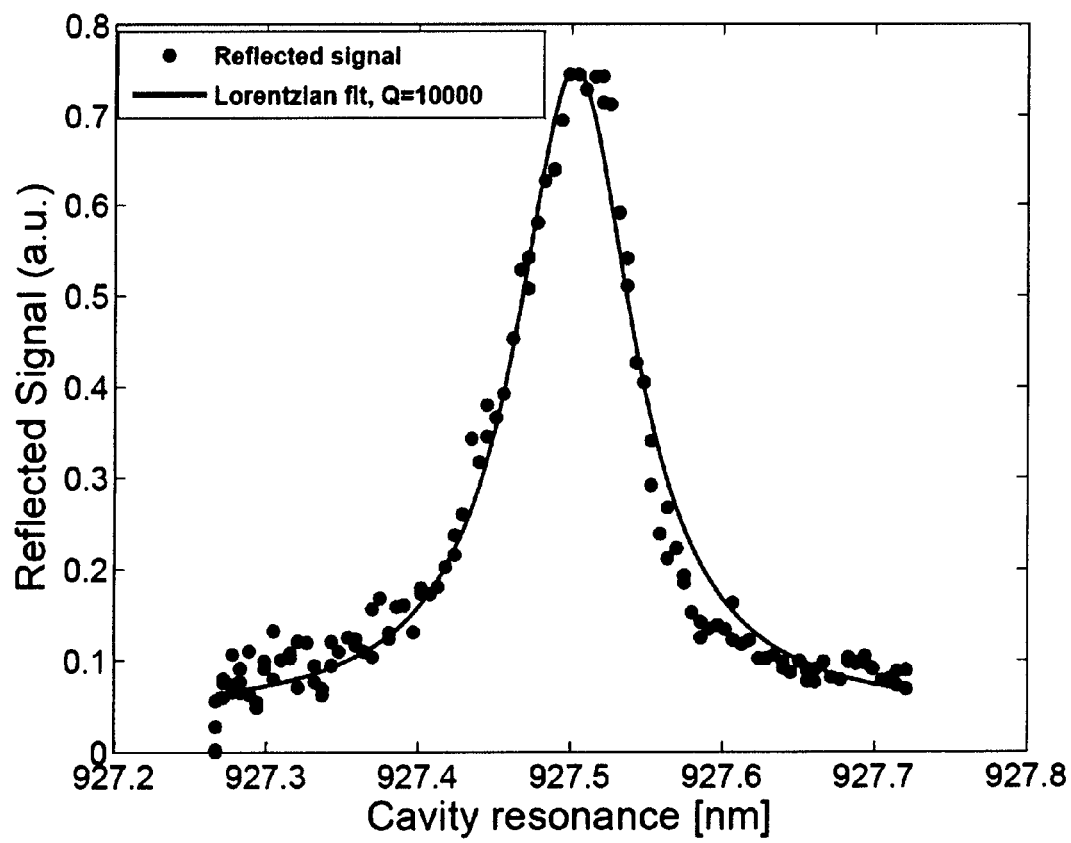
FIG. 2 is a graph of the experimentally measured reflected optical intensity versus wavelength for an empty photonic crystal cavity exhibiting Q~10,000.

FIG. 2 is a graph of the experimentally measured reflected optical intensity versus wavelength for an empty photonic crystal cavity similar to that shown in FIG. 1. Dots indicate experimental data points while the solid line is a Lorentzian fit with Q~10,000.

I. Cavity QED with Quantum Dots in Photonic Crystals

Consider a single quantum dot isolated in a microcavity and coupled to the cavity field. The coupling strength, g, reaches its maximum value when the QD is located at the point where the electric field energy density is maximum and when the dipole moment is aligned with the electric field.

The losses of the system can be described in terms of the cavity energy decay rate $\kappa$, equal to $\omega/Q$, and the dipole decay rate, $\gamma$. $\kappa$ is the decay rate of the resonant cavity mode, while $\gamma$ represents QD dipole decay to modes other than the cavity mode and decay to nonradiative decay routes. The relationship between g, $\kappa$ and $\gamma$ defines coupling regimes as specified in Table 2:

TABLE 2

Definitions of various coupling regimes.

| Regime | Definition |
| --- | --- |
| Strong coupling | $g > \kappa/2$ and $g > \gamma$ |
| Weak coupling | $g < \kappa/2$ or $g < \gamma$ |
| Weak coupling, bad cavity limit | $g < \kappa/2$, but $g \gg \gamma$ and $\kappa \gg \gamma$ |

In the strong coupling regime, the time scale of coherent coupling between the QD and the cavity field is shorter than that of the irreversible decay into various radiative and non-radiative routes. Vacuum Rabi oscillation occurs in this case, and the time evolution of the system is described by oscillation at frequency 2 g between the state of an excited dot and no photons in the cavity, and the ground-state quantum dot with one photon in the cavity. We assume that QD dipole decay rates into modes other than the resonant cavity mode and into nonradiative routes are not modified in the presence of a cavity, and estimate $\gamma$ from the homogeneous linewidth of the QD without a cavity. In the strong coupling regime the QD and the cavity cannot be treated as distinct entities; entangled modes of the QD and cavity field are formed.

In the weak coupling regime, irreversible decay rates dominate over the coherent coupling rate; in other words, the QD-cavity field system does not have enough time to couple coherently before dissipation occurs. In the "bad cavity limit" where $g < \kappa/2$, but $K\kappa \gg \gamma$, the spontaneous emission decay rate of the QD into the cavity mode is $$\Gamma = |g(\vec{r})|^2 \frac{4Q}{\omega}$$

which is enhanced relative to the spontaneous emission rate of the same QD in bulk semiconductor by the Purcell factor.

When a QD is positioned at the maximum of the electric field energy density with its dipole moment aligned with the electric field, and on resonance with the cavity mode, the Purcell factor is maximized and equal to $$F = \frac{3}{4\pi^2} \frac{Q}{V} \left(\frac{\lambda}{n}\right)^3.$$

When a QD is placed in a PC cavity the QD emission rate can be strongly enhanced via interaction with a cavity mode. At the same time, emission in to other modes is suppressed by the photonic band gap. This regime is significant in the construction of efficient single photon sources.

II. Dipole Induced Transparency and Quantum Repeaters

Demonstration of a quantum repeater requires the capability to perform three important operations. First, one must be able to generate entanglement between dipole systems that are separated by large distances. Second, one must be able to measure the state of the individual dipole systems. Finally, an efficient quantum repeater requires the ability to perform a full Bell measurement between two dipole systems in order to implement efficient entanglement swap and entanglement purification.

Figure 3:
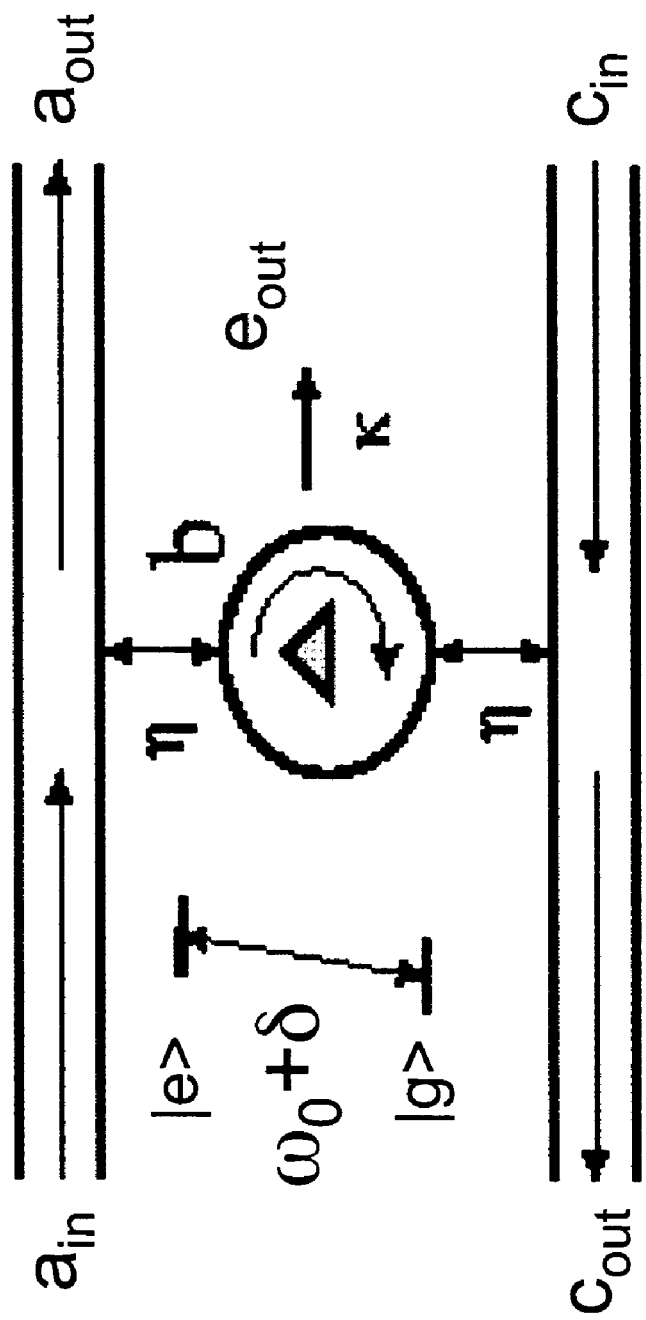
FIG. 3 is a schematic diagram of a cavity—waveguide system for quantum repeaters.

FIG. 3 is a schematic diagram of a cavity—waveguide system for quantum repeaters. A cavity containing a single dipole emitter is evanescently coupled to two waveguides. The cavity is assumed to have a single relevant mode, which couples only to the forward-propagating fields (e.g., a whispering gallery mode). The dipole may be detuned by δ from cavity resonance, denoted $\omega_o$, while g is coupling strength between the dipole and the cavity field. The parameter η is the energy decay rate from the cavity into each waveguide. The operators $\hat{a}_{in}$ and $\hat{c}_{in}$ are the field operators for the flux of the two input ports of the waveguides, while $\hat{e}_{out}$ is the operator for potential leaky modes due to all other losses such as out-of-plane scattering and material absorption. The bare cavity has a resonant frequency $\omega_0$ and an energy decay rate K in the absence of coupling to the waveguides. This decay rate is related to the cavity quality factor Q by $\kappa=\omega_0/Q$.

Figure 4:
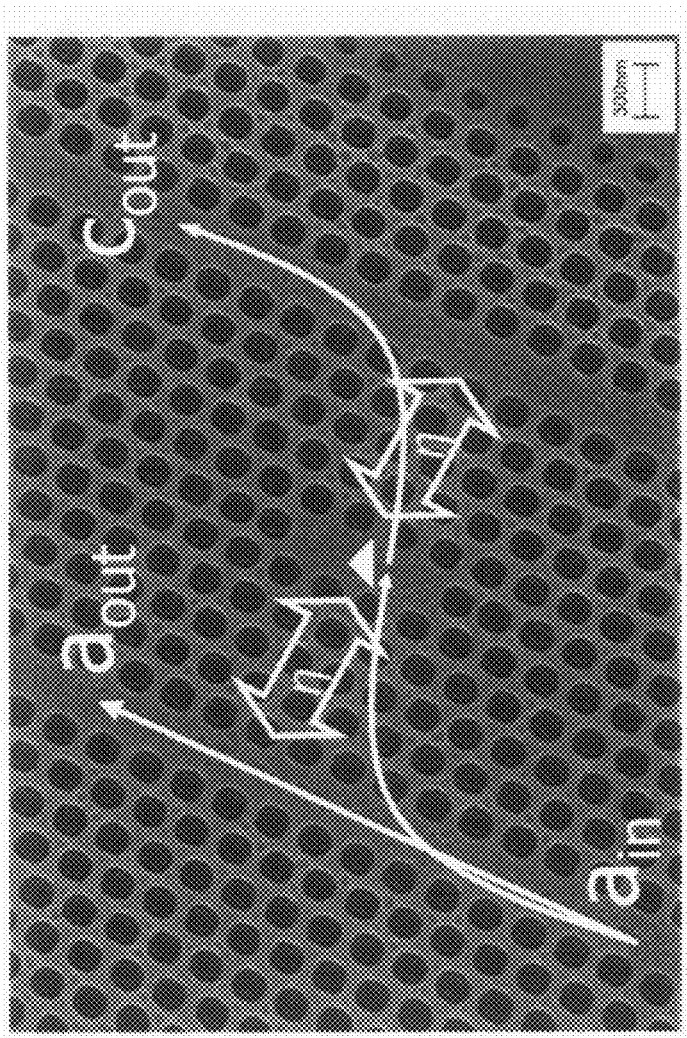
FIG. 4 is a scanning electron micrograph of an experimental realization of the system shown schematically in FIG. 3. The cavity and waveguides are formed in a photonic crystal.

FIG. 4 is a scanning electron micrograph of an experimental realization of the system shown schematically in FIG. 3. The cavity and waveguides are formed in a photonic crystal. A quantum dot lies in the cavity which is coupled to the waveguides. The energy decay rate from the cavity into each waveguide is denoted η. The scale bar in the lower right corner of the micrograph is 300 nanometers long.

To analyze this system, we start with the Heisenberg operator equations for the cavity field operator $\hat{b}$ and dipole operator $\sigma_-$. Assuming the cavity is excited by a weak monochromatic field with frequency ω, we calculate the response of $\hat{b}$ and $\sigma_-$ in frequency space. We assume that the cavity decay rate is much faster than the dipole decay rate, so that $\eta/\gamma\approx 0$. This is a realistic assumption for a quantum dot coupled to a photonic crystal cavity, but does not necessarily apply in atomic systems coupled to very high-Q optical resonators. We also consider the weak excitation limit, where the quantum dot is predominantly in the ground state ($\langle\sigma_z(t)\rangle\approx-1$ for all time). This condition essentially states that the incoming photon flux $\langle\hat{a}_{in}^+\hat{a}_{in}\rangle$ must be much smaller than the modified spontaneous emission decay rate of the emitter (in the limit that the cavity decay is dominated by the leakage into the waveguide described by η), and is well satisfied in the operating regime we are working in. In this limit the waveguide input-output relations are given by the expressions shown in FIG. 8 where $\Delta\omega=\omega-\omega_0$.

Consider the case where the dipole is resonant with the cavity, so that δ=0. In the ideal case, the bare cavity decay rate K is very small and can be set to zero. In this limit, when the field is resonant with the cavity and g=0 we have $\hat{a}_{in}=-\hat{c}_{out}$, as one would expect from critical coupling. In the opposite regime, when $g^2>>(\eta+\kappa/2)\gamma$ we have $\hat{a}_{in}=\hat{a}_{out}$, so that the field remains in the original waveguide. This condition can be re-written as $$F = \frac{g^2}{(\eta+\kappa/2)\gamma} \gg 1$$

where F is the Purcell factor. Here ">>1" means "at least greater than 10."

Thus, in order to make the waveguide transparent (i.e., decouple the field from the cavity), we need to achieve a large Purcell factor. However, we do not need the full normal mode splitting condition $g>(\eta+\kappa/2)$. When $\gamma<<(\eta+\kappa/2)$ transparency is obtained for much smaller values of g.

Figure 5:
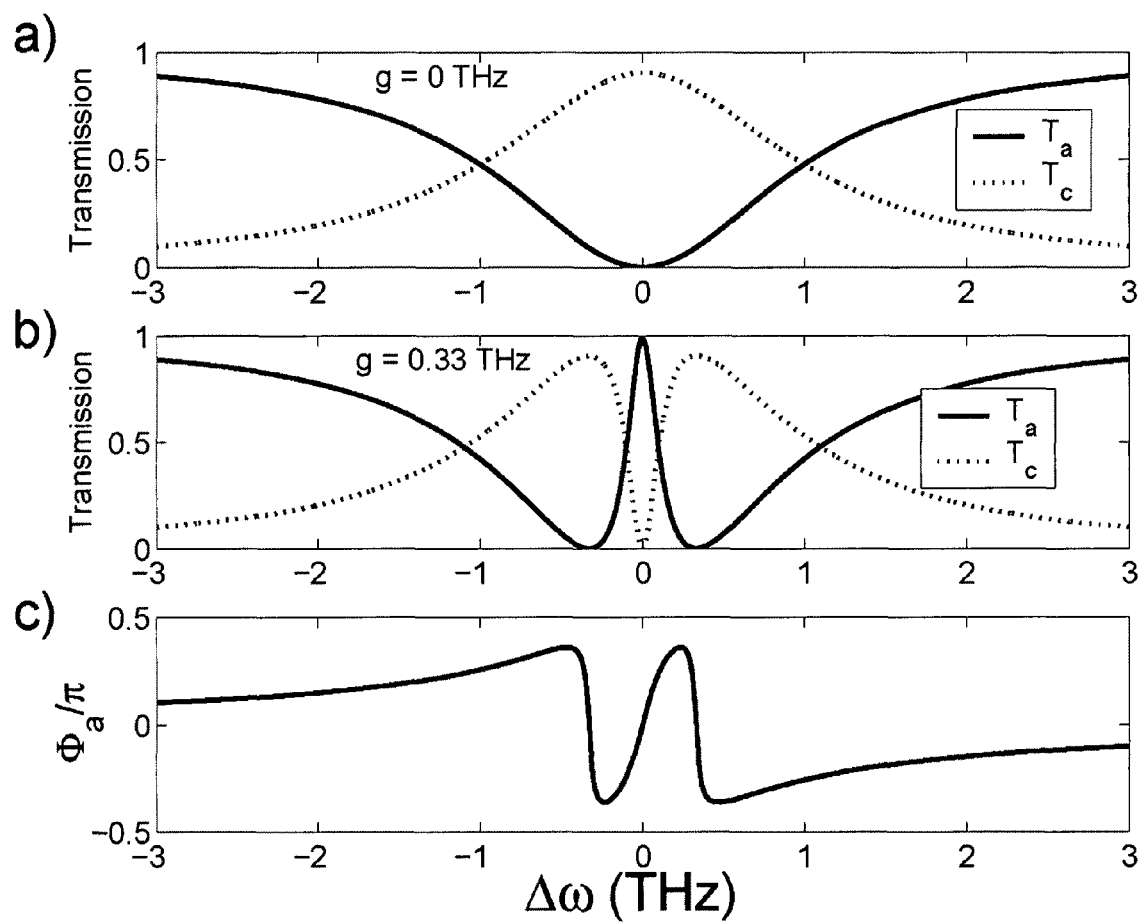
FIGS. 5a-5c show calculated waveguide transmission and phase shift versus frequency for the structure of FIG. 4 when the dipole is on resonance with the cavity. $\eta=1$ THz and $\kappa/2 \ll \eta$, in agreement with experiments.

FIG. 5 plots the probability that $\hat{a}_{in}$ transmits into $\hat{a}_{out}$ and $\hat{c}_{out}$. Assuming that the initial field begins in mode $\hat{a}_{in}$, we define $$\frac{\hat{a}_{out}}{\hat{a}_{in}} = \sqrt{T_a}\, e^{i\Phi_a} \text{ and } \frac{\hat{c}_{out}}{\hat{a}_{in}} = \sqrt{T_c}\, e^{i\Phi_c},$$

and use cavity and dipole parameters that are appropriate for a photonic crystal cavity coupled to a quantum dot. We set η=1 THz which is about a factor of 10 faster than κ for a cavity with a quality factor, Q=10000. We set g=0.33 THz, a number calculated from FDTD simulations of cavity mode volume for a single defect dipole cavity in a planar photonic crystal coupled to a quantum dot. The dipole decay rate is set to γ=0.5 GHz, taken from experimental measurements.

FIG. 5a shows the case where the cavity does not contain a dipole. In this case g=0, representing a system where the two waveguides are coupled by a drop filter cavity. The width of the transmission spectrum for the drop filter is determined by the lifetime of the cavity, which in our case is dominated by η. When a dipole is present in the cavity, the result is plotted in FIG. 5b. In this case, a very sharp peak in the transmission spectrum appears at Δω=0, with a width of approximately 0.1 THz, although g is three times smaller than the cavity decay rate η. On resonance, the field does not couple to the cavity and is instead transmitted through the waveguide. We refer to this effect as Dipole Induced Transparency (DIT), as the presence of a single dipole in the channel drop filter changes its transmission. In the high-Q regime where g>>η and in the limit of η>>κ/2 (cavity losses are dominated by waveguides), the full width half maximum of the transmission dip is equal to 2g as expected by normal mode splitting. In the low-Q regime where g<<η, and assuming that η>>κ/2, the spectral width of the transmission peak is equal to $g^2/\eta$ (the modified spontaneous emission rate of the dipole).

In FIG. 5c we plot $\Phi_a$ for the case where g=0.33 THz. The region near zero detuning exhibits very large dispersion, which results in a group delay given by $\tau_g=(\eta+\kappa/2)/g^2=\tau_{mod}$, where $\tau_{mod}$ is the modified spontaneous emission lifetime of the dipole. One can show that the group velocity dispersion at zero detuning vanishes, ensuring that the pulse shape is preserved.

Figure 6:
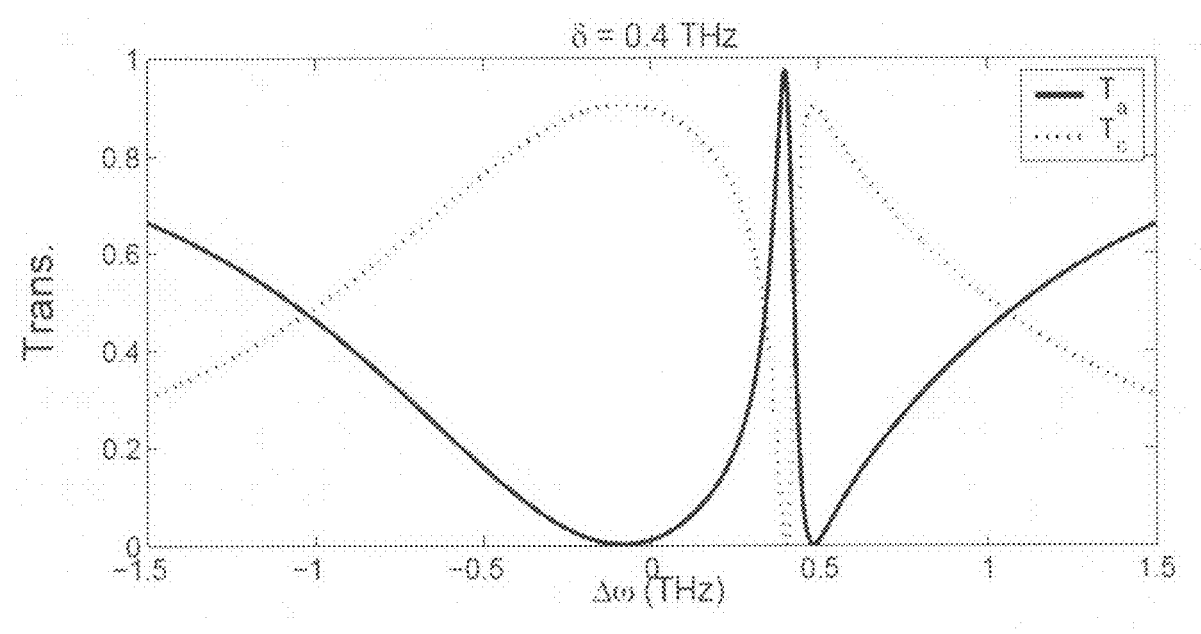
FIG. 6 shows calculated waveguide transmission for the structure of FIG. 4 when the dipole detuned from the cavity by $\delta=0.4$ THz. $\eta=1$ THz and $\kappa/2 \ll \eta$.

We now consider the effect of detuning the dipole. The transmission spectrum for a detuned dipole is plotted in FIG. 6, where δ denotes the dipole detuning from the cavity resonance. Introducing a detuning in the dipole causes a shift in the location of the transmission peak, so that destructive interference occurs when the field frequency is equal to the dipole frequency. Thus, we do not have to hit the cavity resonance very accurately to observe DIT. We only need to overlap the dipole resonance within the cavity transmission spectrum.

Figure 7:
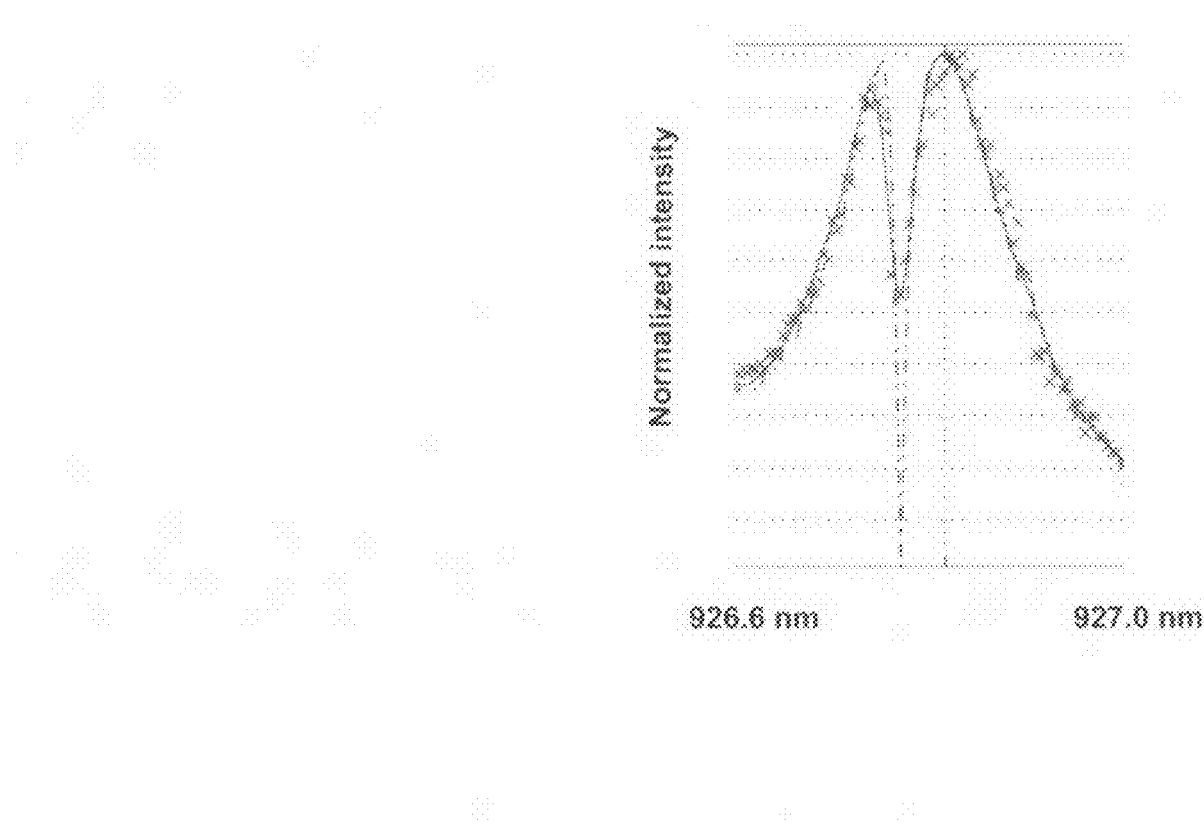
FIG. 7 is a graph of the experimentally measured reflected optical intensity versus wavelength for a photonic crystal cavity coupled to a quantum dot.

FIG. 7 is a graph of the experimentally measured reflected optical intensity versus wavelength for a photonic crystal cavity coupled to a quantum dot. As predicted by Dipole Induced Transparency theory, a sharp dip is observed in the reflection spectrum. A single quantum dot controls the transmission of weak coherent light from input port $a_{in}$ to output ports $a_{out}$ and $c_{out}$. In the graph, x's mark experimental data points, while the solid curve is generated from the theory presented above.

Figure 9:
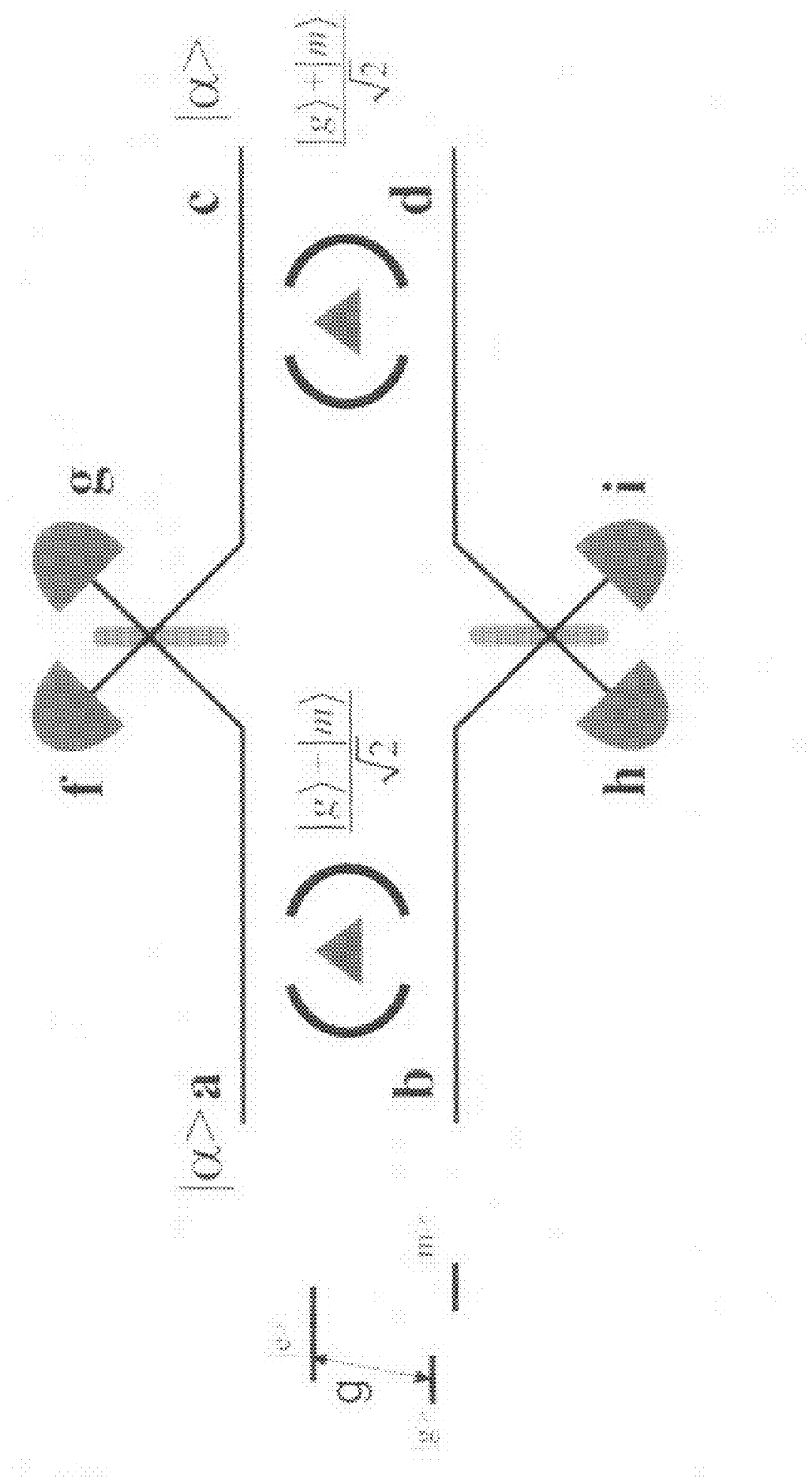
FIG. 9 illustrates a method for generating entanglement between two dipoles using dipole induced transparency.

The fact that one can switch the transmission of a waveguide by the state of a dipole in the low-Q regime is useful for quantum information processing. As one example, we now present a way in which DIT can be applied to engineering quantum repeaters for long distance quantum communication. In FIG. 9 we show how DIT can be used to generate entanglement between two spatially separated dipoles. A weak coherent beam is split on a beamsplitter, and each port of the beamsplitter is then sent to two independent cavities containing dipoles. The waveguide fields are then mixed on a beamsplitter such that constructive interference is observed in ports f̂ and ĥ. Each dipole is assumed to have three relevant states, a ground state, an excited state, and a long-lived metastable state which we refer to as |g⟩, |e⟩, and |m⟩ respectively. The transition from ground to excited state is assumed to be resonant with the cavity while the metastable to excited state transition is well off resonance from the cavity, and is thus assumed not to couple to state |e⟩. The states |g⟩ and |m⟩ represent the two qubit states of the dipole.

When the dipole is in state |m⟩, it does not couple to the cavity, which now behaves as a drop filter. Thus, we have a system that transforms $\hat{a}_{in}^+|g\rangle 0\rangle \rightarrow \hat{a}_{out}^+|g\rangle 0\rangle$ and $\hat{a}_{in}^+|m\rangle 0\rangle \rightarrow -\hat{c}_{out}^+|m\rangle 0\rangle$. This operation can be interpreted as a C-NOT gate between the state of the dipole and the incoming light. When the dipole is in a superposition of the two states, this interaction generates entanglement between the path of the field and the dipole state. After the beamsplitter, this entanglement will be transferred to the two dipoles. If the state of both dipoles is initialized to $(|g\rangle+|m\rangle)/\sqrt{2}$, it is straightforward to show that a detection event in ports ĝ or î collapses the system to $(|g,m\rangle-|m,g\rangle)/\sqrt{2}$.

Figure 10:
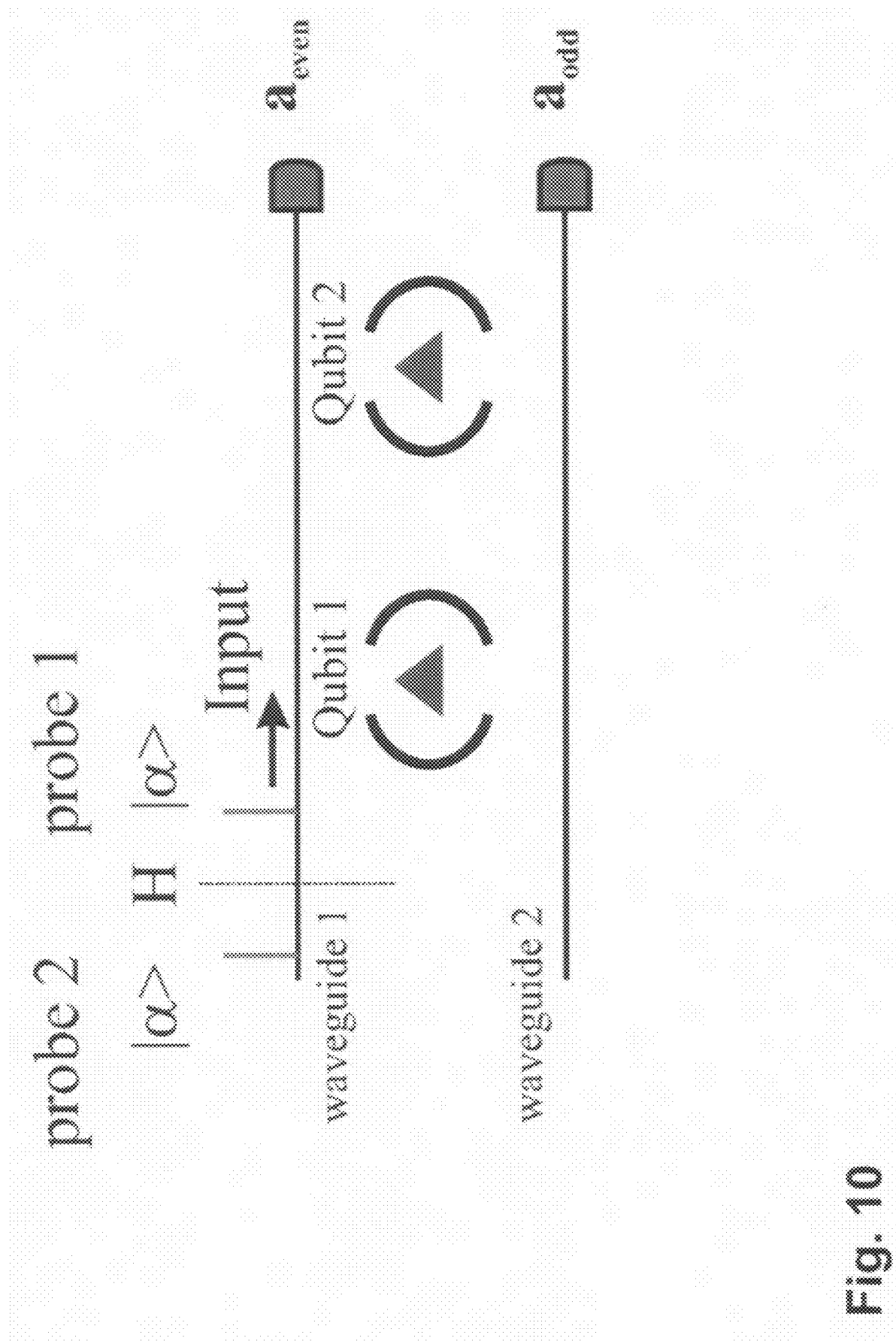
FIG. 10 illustrates a method for performing a non-destructive Bell measurement using dipole induced transparency.

Another important operation for designing repeaters is a Bell measurement, which measures the system in the states $|\phi_{\pm}\rangle=(|gg\rangle\pm|mm\rangle)/\sqrt{2}$ and $|\Psi_{\pm}\rangle=(|gm\rangle\pm|mg\rangle)/\sqrt{2}$. FIG. 10 shows how to implement a complete Bell measurement between two dipoles using only cavity waveguide interactions with coherent fields. The two cavities containing the dipoles are coupled to two waveguides. When a coherent field |α⟩ is sent down waveguide 1, each dipole will flip the field to the other waveguide if it is in state |m⟩, and will keep the field in the same waveguide if it is in state |g⟩. Thus, a detection event at ports $\hat{a}_{even}$ and $\hat{a}_{odd}$ corresponds to a parity measurement. A Bell measurement can be made by simply performing a parity measurement on the two dipoles, then a Hadamard rotation on both dipoles, followed by a second parity measurement. This is because a Hadamard rotation flips the parity of $|\psi_+\rangle$ and $|\phi_-\rangle$ but does not affect the parity of the other two states.

Figure 11:
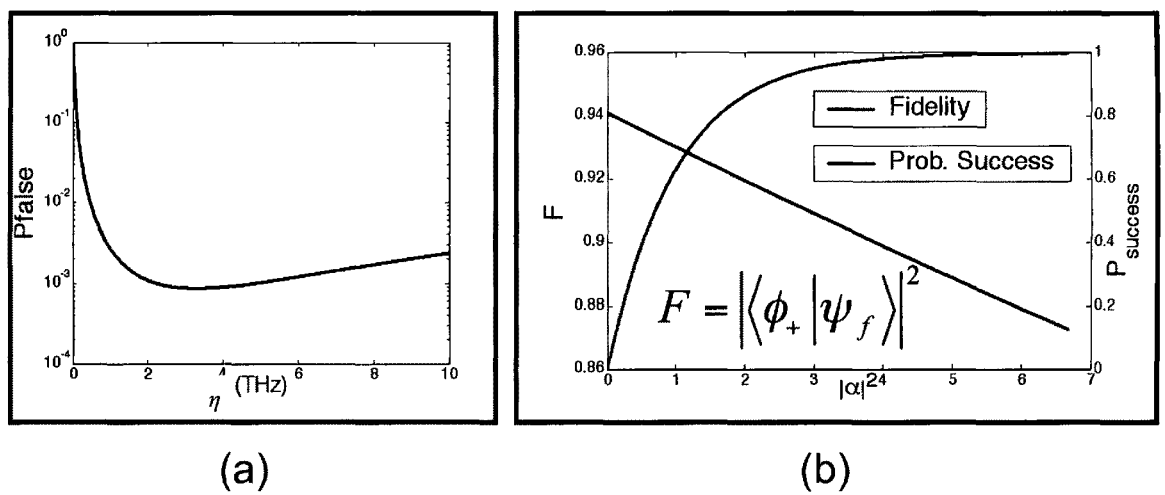
FIGS. 11a & 11b are plots of the probability of detecting even parity given an odd parity state as a function of $\eta$, and the fidelity of the state $(|gg\rangle \pm |mm\rangle)/\sqrt{2}$ after a parity measurement, respectively.

The performance of the Bell apparatus is analyzed in FIG. 11. FIG. 11a plots the probability that an odd parity state will falsely create a detection event in port $\hat{a}_{even}$, as a function of η. The probability becomes high at large η due to imperfect transparency. It also increases at small η because of imperfect drop filtering. The minimum value of about $10^{-3}$ is achieved at η≈3 THz. In FIG. 11b we plot both the fidelity and success probability of a parity measurement as a function of the number of photons in the probe field. The fidelity is calculated by applying the Bell measurement to the initial state $|\psi_i\rangle=(|g,g\rangle\pm|m,m\rangle)/\sqrt{2}$, and defining the fidelity of the measurement as $F=|\langle\psi_f|\psi_i\rangle|^2$, where $|\psi_f\rangle$ is the final state of the total system which includes the external reservoirs. The probability of success is defined as the probability that at least one photon is contained in the field. The fidelity is ultimately limited by cavity leakage, which results in "which path" information being leaked to the environment. This information leakage depends on the strength of the measurement which is determined by the number of photons in the probe fields. Using more probe photons results in a higher success probability, but a lower fidelity. To calculate this tradeoff, we use previously described values for cavity and reservoir losses, and set the coupling rate η to 4 THz, which is where the probability of false detection is near its minimum. At an average of three photons, fidelity over 90% can be achieved with a success probability exceeding 95%. These numbers are already promising, and improved cavity and dipole lifetimes could lead to even better operation.

To recap, we have shown that when an optical input field is resonant with a cavity, a drop filter normally transmits the field from one waveguide to the other. Hence, the waveguide appears opaque at the cavity resonance. However, if one places a dipole in the drop-filter cavity, the waveguide becomes highly transparent even when g is much smaller than the cavity decay rate. In the low-Q regime, where g is less than the cavity decay rate, this result is surprising because the incident field can still drive both cavity polariton modes. Transparency in this regime is instead caused by destructive interference of the cavity field. This effect is analogous to the destructive interference of the excited state of a 3-level atomic system in Electromagnetically Induced Transparency (EIT). For this reason we named the effect Dipole Induced Transparency (DIT).

Dipole induced transparency may be demonstrated in a variety of physical implementations involving optical waveguides coupled to cavities containing single dipole emitters. For example, coupled cavity-waveguide systems can be realized in microdisks coupled to fibers, microdisks coupled to ridge waveguides, or double sided Fabry-Perot cavities. Single dipole emitters suitable for placing in an optical cavity include semiconductor quantum dots; nitrogen vacancies in diamond; impurities embedded in solids; single atoms, ions or molecules; and colloidal quantum dots.

An experimental DIT system may be made by patterning a photonic crystal onto a substrate containing InAs quantum dots. In this case, coupled waveguides and cavities are defined by a photonic crystal while InAs quantum dots are used as dipole emitters. Optical cavities used for DIT in this system include a single quantum dot.

Furthermore, DIT effects may be observed at different frequencies depending on the material system used. GaAs and similar materials are suitable for near infrared wavelengths (e.g. ~950 nm) while Si and similar materials are suitable at longer wavelengths (e.g. ~1.5 μm).

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. A quantum electronic switch comprising:
   a) a first waveguide having an input port, $a_{in}$, and an output port $a_{out}$;
   b) a second waveguide having an output port $c_{out}$;
   c) a resonant cavity optically coupled to the first and second waveguides, the cavity having an energy decay rate $\eta$ into each waveguide and an energy decay rate of $\kappa$ in the absence of waveguide coupling; and
   d) a single dipole emitter located in the cavity, wherein the dipole emitter has an energy decay rate of $\gamma$ and a vacuum Rabi frequency g;
   wherein $$\frac{g^2}{(\eta+\kappa/2)\gamma} \gg 1,$$

and wherein a spectrum of light transmitted from $a_{in}$ to $c_{out}$ can be altered by providing an optical field to the dipole emitter.

2. The switch of claim 1, wherein g<$\kappa$/2 and $\gamma$<<($\eta$+$\kappa$/2).

3. The switch of claim 1, wherein the dipole emitter causes a peak in the spectrum of light transmitted from $a_{in}$ to $c_{out}$ when a resonant frequency of the dipole emitter overlaps with a cavity transmission spectrum.

4. The switch of claim 1, wherein the dipole emitter causes a dip in the spectrum of light transmitted from $a_{in}$ to $c_{out}$ when a resonant frequency of the dipole emitter overlaps with a cavity transmission spectrum.

5. The switch of claim 1, wherein the waveguides and resonant cavity are fabricated in a photonic crystal.

6. The switch of claim 1, wherein the dipole emitter is a quantum dot.

7. The switch of claim 1, wherein the dipole emitter is a colloidal quantum dot.

8. The switch of claim 1, wherein the resonant cavity is a microdisk.

* * * * *